Figure 1:
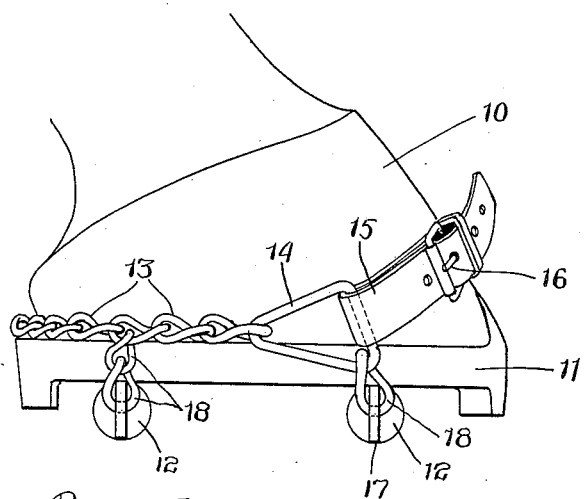

M. J. O'NEILL.
NON-SLIPPING ATTACHMENT FOR HORSESHOES.
APPLICATION FILED MAR. 8, 1913.

1,064,246. Patented June 10, 1913.

WITNESSES:
H. W. Meade
S. W. Atherton.

INVENTOR
Maurice J. O'Neill
BY
A. M. Wooster
ATTORNEY

UNITED STATES PATENT OFFICE.

MAURICE J. O'NEILL, OF STAMFORD, CONNECTICUT, ASSIGNOR OF ONE-HALF TO ROBERT H. DAVIS, OF STAMFORD, CONNECTICUT.

NON-SLIPPING ATTACHMENT FOR HORSESHOES.

1,064,246. Specification of Letters Patent. Patented June 10, 1913.

Application filed March 8, 1913. Serial No. 753,008.

*To all whom it may concern:*

Be it known that I, MAURICE J. O'NEILL, a citizen of the United States, residing at Stamford, county of Fairfield, State of Connecticut, have invented an Improvement in Non-Slipping Attachments for Horseshoes, of which the following is a specification.

This invention has for its object to provide a simple and inexpensive non-slipping attachment for horseshoes that may be applied or removed in an instant's time and without the use of tools, that will stand the hardest kind of usage and that will hold the hoof against slipping forward, backward or laterally upon ice or upon muddy asphalt pavements.

With these objects in view I have devised the simple and inexpensive attachment which I will now describe, referring to the accompanying drawing forming a part of this specification and using reference characters to indicate the several parts.

Figure 2:
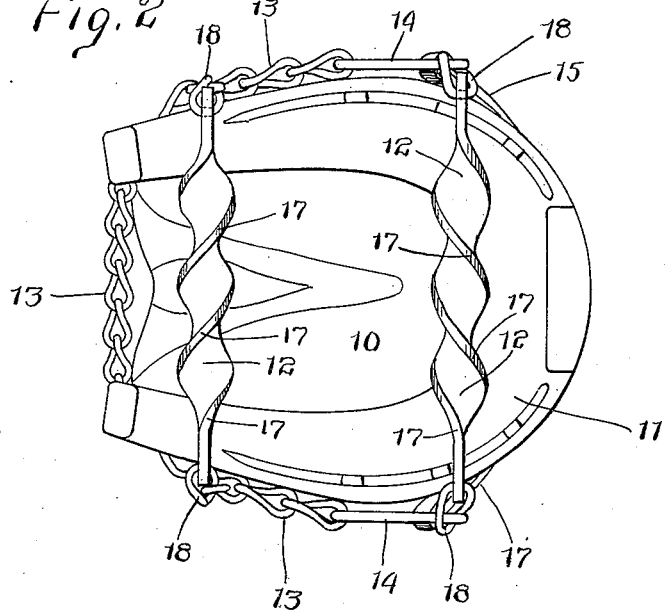

Figure 1 is an elevation of a horse's hoof with my novel non-slipping attachment in place thereon, and Fig. 2 is an inverted plan view of the hoof and the attachment.

This attachment is intended for use only upon ice or upon slippery pavements and is applied over the ordinary shoe which is firmly supported by the attachment both at the toe and at the heel.

The essential features of my novel attachment are transverse plates or bars of metal twisted in opposite directions so as to provide a firm hold against slipping in any direction. I have shown, and preferably use, two only of these transverse bars, although a third bar may be used if preferred. These bars may be held in place in any ordinary or preferred manner, preferably substantially as shown in the drawing, by means of a chain having angular eyes at its ends, and a strap.

10 denotes a hoof, 11 an ordinary horseshoe thereon, 12 the twisted transverse bars, 13 the chain, 14 angular eyes at the ends of the chain and 15 a strap connecting the eyes and shown as provided with a buckle 16. The transverse bars are simply flat strips of metal cut to suitable lengths and twisted substantially as shown in the drawing, the object being to provide four, more or less, edge engaging points upon the bars which are specifically indicated by 17. The ends of the bars are preferably adapted to lie in the vertical plane when attached. The chain passes partly around the hoof, lying between the hoof and the shoe at the rear, and being supported by the shoe which prevents it from slipping off. The eyes are simply provided as a convenient means for attaching the strap. The bars are provided at their ends with holes through which supplemental links 18 pass. The rear transverse bar is shown as connected at each end to the chain by two supplemental links connected together, one of which engages the chain, the other the bar. The front transverse bar is shown as connected at each end to the eyes by one supplemental link which engages both the link and the end of the bar.

It will be obvious that mere ordinary skill is required in securing the attachment in place and no tools whatever. The hoof is lifted and turned backward, the transverse bars and the chain placed in position, as shown, and the attachment is securely retained in place by tightening up the strap and securing it by means of the buckle, the chain, as stated above, being supported by the rear end of the shoe and lying between the shoe and the hoof.

The operation of my novel attachment in use will be readily understood from the drawing. By twisting the transverse bars and providing each bar with a plurality of edge engaging points, and arranging the bars with the twists extending obliquely in opposite directions (substantially at right angles to the median line of the hoof) I provide a cutting engagement with ice and a means of contact that is practically sure to effect an engagement with even the slipperiest pavement should the hoof commence to slide. This engagement is rendered doubly sure owing to the fact that the looseness of the link connection of the bars with the chain permits a slight rolling movement of the bars when slipping takes place. It will be noted furthermore that owing to the fact that the points of engagement are the obliquely curved edges of the bars the wear will be uniform and the edges of the bar will continue sharp as the bar wears away.

Having thus described my invention, I claim:

1. An attachment of the character described comprising transverse bars twisted in opposite directions and means for loosely securing said bars under a hoof so as to permit a rolling movement of the bars, whereby a firm engagement is secured.

2. An attachment of the character described comprising transverse bars twisted in opposite directions with their ends lying vertically, an attaching chain provided with eyes at its ends, a strap engaging the eyes, a link connecting the front bar with the eyes and links connecting the rear bar with the chain.

In testimony whereof I affix my signature in presence of two witnesses.

MAURICE J. O'NEILL.

Witnesses:
MABEL E. HAMILTON,
WM. F. WATERBURY.

---

Copies of this patent may be obtained for five cents each, by addressing the "Commissioner of Patents, Washington, D. C."